Oct. 6, 1942.        C. A. FREDRICKSON        2,297,880
FRUIT AND VEGETABLE JUICER
Filed Jan. 21, 1939        3 Sheets-Sheet 1

INVENTOR.
Clarence A. Fredrickson
BY
ATTORNEYS.

Oct. 6, 1942.    C. A. FREDRICKSON    2,297,880
FRUIT AND VEGETABLE JUICER
Filed Jan. 21, 1939    3 Sheets-Sheet 2

INVENTOR.
Clarence A. Fredrickson
BY
ATTORNEYS.

Oct. 6, 1942.   C. A. FREDRICKSON   2,297,880
FRUIT AND VEGETABLE JUICER
Filed Jan. 21, 1939   3 Sheets–Sheet 3

INVENTOR.
Clarence A. Fredrickson
BY
ATTORNEYS.

Patented Oct. 6, 1942

2,297,880

UNITED STATES PATENT OFFICE 2,297,880

FRUIT AND VEGETABLE JUICER

Clarence A. Fredrickson, Tacoma, Wash., assignor to Jiffy Juicing Machines, Inc., Yakima, Wash., a corporation of Washington Application January 21, 1939, Serial No. 252,158

7 Claims. (Cl. 146—3)

This invention relates to fruit and vegetable juicers and for its primary objects is directed to the provision of a juicing machine of a form particularly convenient to use; a machine which is especially easy to disassemble for cleaning; a machine which relies for its operation upon the initial step of cutting the work through the application of teeth arranged to completely reduce the work from a vascular to a substantially disintegrated form; a machine in which this disintegrated tissue is compacted by the physical force of centrifugal action to completely free the same of the juice content, an extraction step which obviates the bruising effects of trituration; a machine in which the moving parts are completely housed to preclude possibility of injury to the user; and generally to provide a machine which, with the above and other attributes to perfection in juicing the nature of which will become apparent in the course of the following detailed description and claims, assures appreciably greater juicing efficiency than has been heretofore possible and in fact provides complete satisfaction in the operation of extracting juices from foods.

The invention consists in the advanced method of extracting juices and in the novel construction, adaptation and combination of parts employed therefor, as hereinafter described and claimed.

Figure 8:
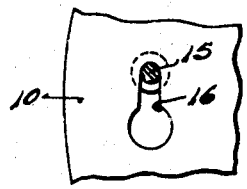
Fig. 8 is a fragmentary horizontal section on line 8—8 of Fig. 1 to indicate the bayonet-joint connection for detachably mounting the casing which houses the juicing parts of the machine on the motor housing which operates as a base for the same.
Figure 1:
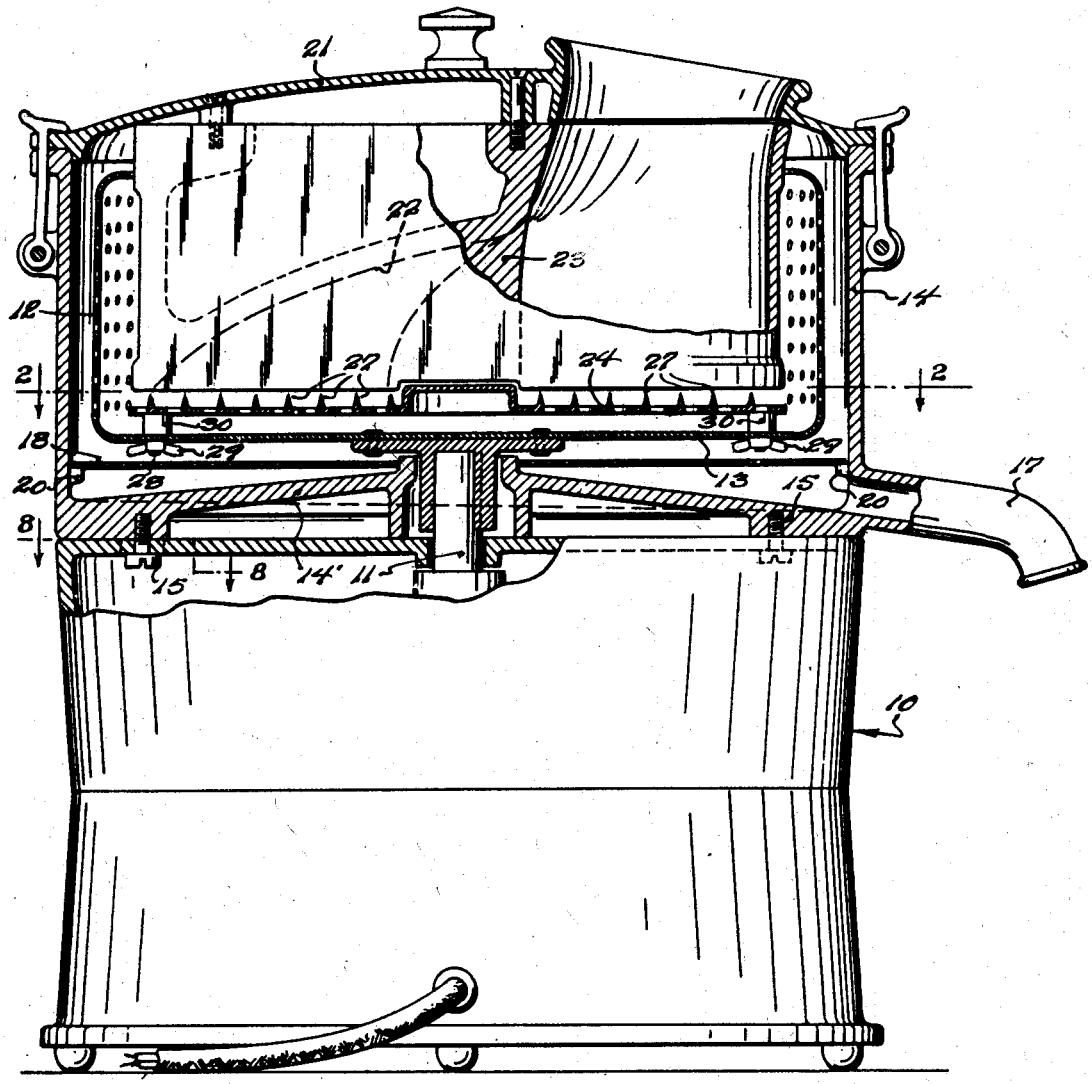
Figure 1 is a view partly in side elevation and partly in longitudinal vertical section representing a juicing machine embodying the present invention.

Having reference to said drawings, the numeral 10 designates the base and housed therein is an electric motor of which the power shaft 11, revoluble on a vertical axis, protrudes slightly above the upper level of the housing and is flattened on one side or otherwise suitably formed to permit a power take-off therefrom to a rotary basket of circular form providing a perforated side wall 12 and having the bottom wall 13 imperforate, said basket being received within a non-rotary casing 14 detachably mounted on the motor housing. Said detachable mounting is indicated as comprising headed bolts 15 threaded into the basal wall of the casing at diametrically opposite sides thereof and working in key-hole slots 16 formed in the upper wall of the motor housing. The casing is open at the top and has its bottom wall, denoted by 14', sloped outwardly from the center to form a surrounding gutter from which collected juices are gravitationally fed to a discharge spigot 17. Above the gutter is a stationary screen 18 supported on lugs 20.

21 designates a dome piece which is detachably fitted to the casing and carried by this dome piece to depend into the basket in off-set relation to the center thereof is a funnel-like feed block 23 providing a feed throat 22, said feed throat having its longitudinal median line disposed in approximately concentric relation to the axis of the basket and being formed to a transverse dimension equal to or less than the radius of a horizontal cutting disc 24 with which the same is operatively associated, the upper wall of this feed throat converging in the direction of rotation of the cutting disc toward the horizontal plane occupied by the latter and being fluted longitudinally to form a series of parallel and relatively shallow trenches 25 which terminate in a horizontal and substantially plane shearing edge 26. To assure proper feed of the work through the throat to the cutting disc, I find that the angularity of the converging upper wall is critical and should be approximately 28°30′ from the horizontal.

Figure 6:
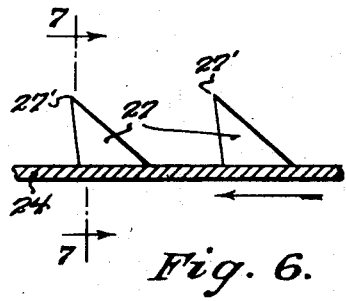
Fig. 6 is an enlarged detail sectional view taken through the cutting disc on line 6—6 of Fig. 2.
Figure 7:
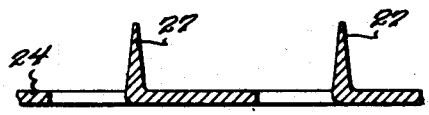
Fig. 7 is a detail sectional view on line 7—7 of Fig. 6.
Figure 2:
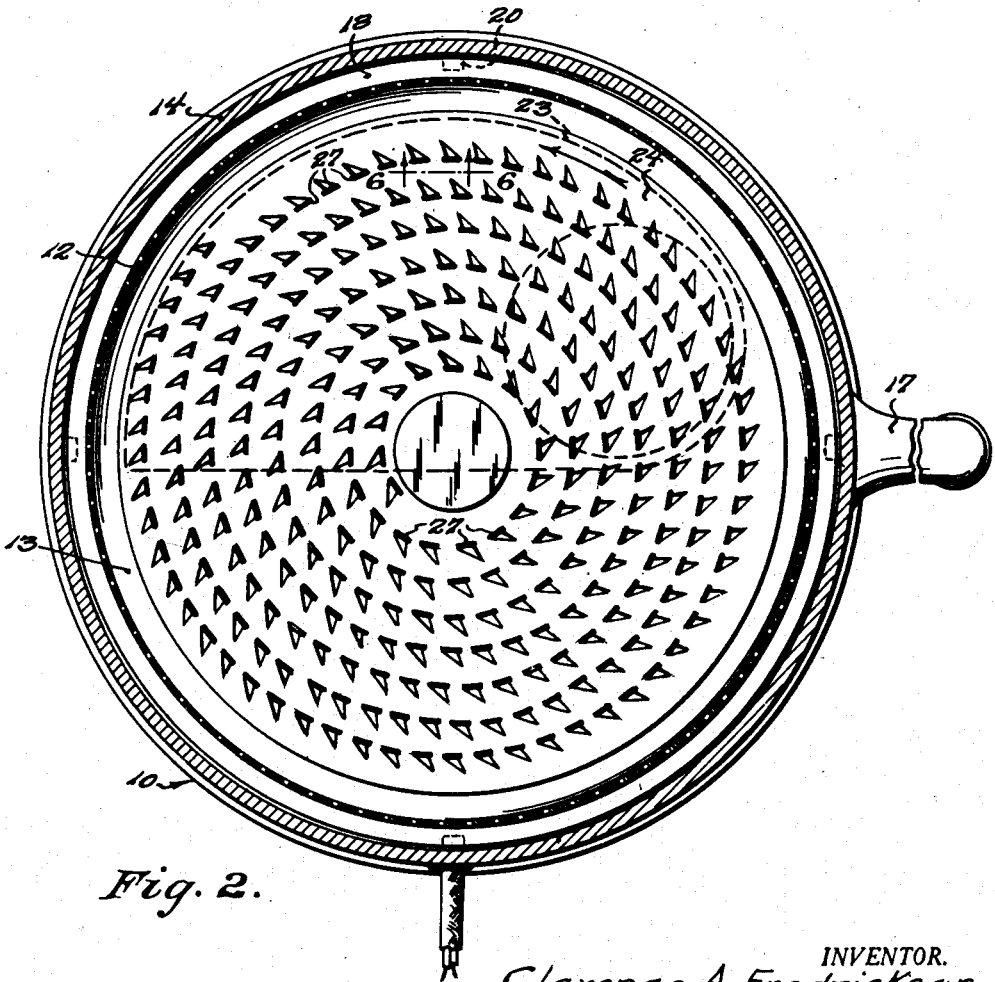
Fig. 2 is a horizontal section thereof on line 2—2 of Fig. 1.
Figure 4:
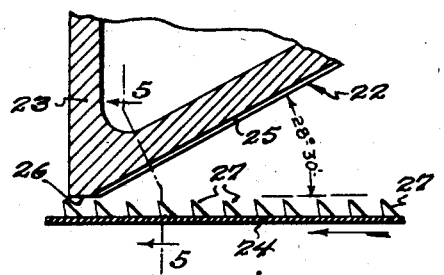
Fig. 4 is a fragmentary vertical section detailing the feed throat and the disintegrating teeth and taken on a line represented by 4—4 of Fig. 3.
Figure 5:
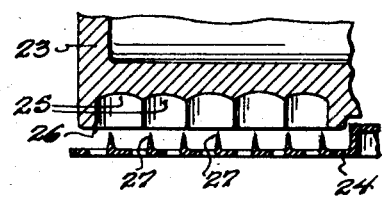
Fig. 5 is a fragmentary vertical section taken on line 5—5 of Fig. 4.
Figure 3:
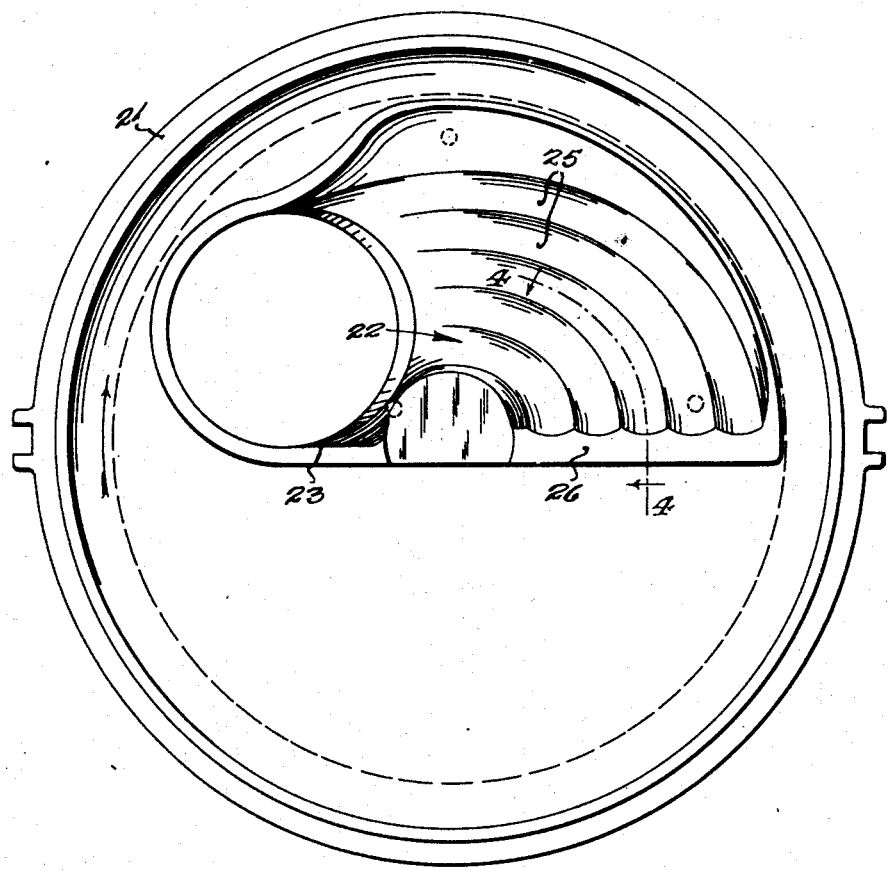
Fig. 3 is an underside plan view of the lid or dome piece of the machine and the feed block carried thereby and illustrating particularly the form of the throat through which the work is fed to the disintegrating teeth.

Said cutting disc is characterized by multiple upstanding teeth 27 and connects with the rotary basket by means such as the indicated disc-carried bolts 28 and complementary wing-nuts 29, the bolts passing through spacers 30 to elevate the disc above the imperforate floor 13 and into a position whereat the teeth barely clear the shearing edge 26. The teeth are produced by punching the same from the body of the disc and toward the axial center thereof to have the same lie substantially in right angular relation to traversing radii of the disc, and desirably are scalene triangular in form to provide an overhanging tip 27' (Fig. 6). Describing said teeth in more particularity insofar as their arrangement, one to another, is concerned, it will be seen from an inspection of Fig. 2 that the several teeth are produced on a spiral train of which a concentric prolongation of each tooth either laps or is osculatory to the preceding tooth, the spiral being so disposed relative to the direction of rotation of the disc that the progressive traversal by the tooth train of the fixed radial line of the shearing edge 26 is from the inner to the outer limits thereof.

The operator, in using the machine, introduces the work through the opening in the dome-piece into the chamber of the feed block from where the same is advanced longitudinally of the throat by the rotation of the disc, the fluting of the throat holding the work against transverse movement while permitting forward travel as the teeth progressively disintegrate the same from the bottom upwardly. It is to be particularly noted that the action of the teeth is one of comminuting the tissues, the minute cutting sphere of each tooth obviating any tendency to gouge or otherwise strip the fibers from the work. This comminuted tissue or pulp, having its cellular structure completely disrupted, works under the shearing edge 26 and through the openings in the disc from which the teeth are struck and by centrifugal action is carried against the screening wall 12, the liberated juices passing through the stationary screen 18 to the gutter and therefrom through the spigot 17 to a receptacle placed below the latter. The highly porous condition of the disintegrated pulp permits the same to pack to an appreciable depth over the screening wall 12 without interrupting the passage of juices from succeeding layers of pulp. The facility with which the parts can be disassembled for cleaning is of course apparent.

It is to be understood that I imply no unnecessary restrictions from the foregoing detailed description of the preferred machine which I illustrate. My intention is to limit the scope of the invention only as such limitations are necessarily brouht into the hereto annexed claims to distinguish the present advancements from prior knowledge in the art of juicing machines.

What I claim, is:

1. In a fruit and vegetable juicer, the combination of a basket revoluble about a vertical axis and provided with a perforated side wall and an imperforate floor, a rotary cutting disc supported within the basket in spaced relation above the imperforate floor thereof, the cutters of said cutting disc comprising upstanding teeth struck upwardly and inwardly from the body of the disc to lie at substantial right angles to the plane of the disc surface and to traversing radii of the disc and leaving openings in the latter leading to the space between said disc and the imperforate floor, and means depending into the basket and forming a delivery throat terminating immediately above the upper limits of the teeth for feeding the material which is to be juiced into cutting relation thereto, said throat being arranged and adapted to overlie a segmental portion of the disc and having its upper wall converging toward the surface of the latter in the direction of disc rotation.

2. In a juicing machine; the combination with a revoluble cutting disc; of a member functioning to feed the material which is to be juiced to said cutting disc, said member providing a delivery throat formed with an open bottom and a sloping upper wall converging toward the cutting disc in the direction of rotation of the latter, the sloping wall being longitudinally fluted to provide relatively shallow trenches for resisting transverse movement of the material being fed through the same, said trenches lying parallel with one another and spirally in relation to the axis of the disc receding from said axis in the direction in which the material is fed.

3. In a fruit and vegetable juicer; the combination of a basket revoluble about a vertical axis and provided with a perforated side wall; a rotary cutting disc supported within the basket and describing a floor for the latter; a motor functioning to impart high-velocity rotation to the basket and disc; and stationary means depending into the basket and forming a delivery throat terminating immediately above the upper limits of the disc for feeding the material which is to be juiced into cutting relation to the disc, said throat being disposed to overlie a segmental portion of the disc and having its upper wall characterized in that the same converges toward the surface of the disc in the direction of disc rotation.

4. In a fruit and vegetable juicer: the combination of a basket supported for revoluble movement about a vertical axis and provided with a perforated side wall functioning, by high-velocity rotation of the basket, to screen disintegrated juice-bearing material within the basket by the action of centrifugal force compacting said material against the perforated wall; a motor for imparting said high-velocity rotation to the basket; a cutting disc supported within the basket to occupy a horizontal plane adjacent the bottom of the basket and rotating therewith; and non-rotary means for feeding the material which is to be juiced depending into the basket to terminate immediately above the upper limits of the cutting processes of the disc, said material feeding means providing an admission throat arranged and adapted to overlie a segmental portion of the disc surface and which is characterized that the back wall is relatively precipitate and the front wall converges toward the surface of the disc in the direction of disc rotation, said throat being open at the bottom to expose the material being juiced to said cutting processes of the disc throughout the length of the throat.

5. A fruit and vegetable juicer according to claim 4 wherein the converging front wall of the throat provides means for resisting transverse movement of the material being fed through the same.

6. In a fruit and vegetable juicer: the combination of a basket supported for revoluble movement about a vertical axis and provided with a perforated side wall functioning, by high-velocity rotation of the basket, to screen disintegrated juice-bearing material which is compacted by the action of centrifugal force against the perforated wall; a motor for imparting said high-velocity rotation to the basket; a cutting disc supported to lie horizontally within the basket and revoluble with the basket; and non-rotary means for feeding the material which is to be juiced depending into the basket above a segmental portion of the disc and forming an open-bottom delivery throat of which the upper wall converges in the direction of disc rotation toward the surface of the disc, said material-feeding means providing, at the discharge end of the throat, a plane shearing edge paralleling the face of the disc and arranged and adapted to traverse the path of travel of the cutting processes of the disc immediately above the upper limits of the latter.

7. The fruit and vegetable juicer of claim 6 wherein the segment of the disc covered by said material-feeding means is less than a half-circle to thereby expose the greater portion of the disc for a free centrifugal propulsion from said disc of the disintegrated material passing said shearing edge.

CLARENCE A. FREDRICKSON.